Dec. 2, 1958    A. R. BECHTEL, JR    2,862,609
HEAVY DUTY FLAT WIRE CONVEYOR BELT
Filed Feb. 28, 1956
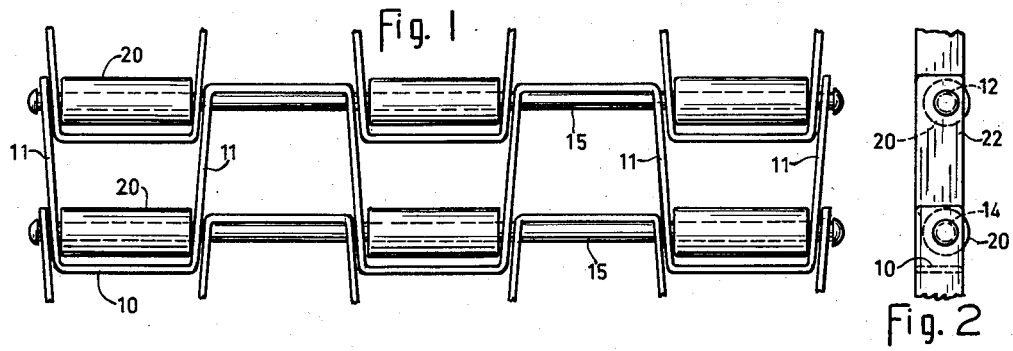
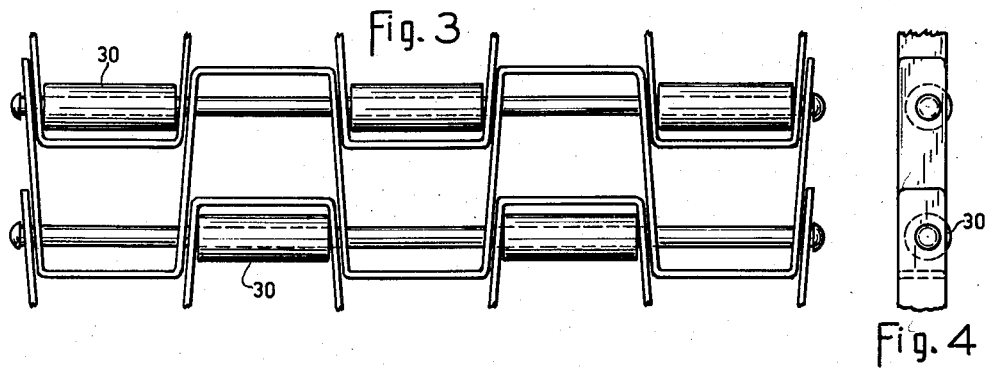
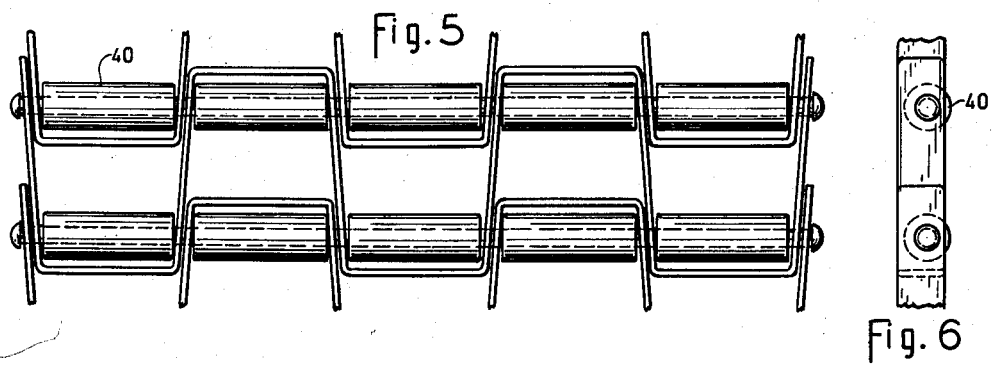
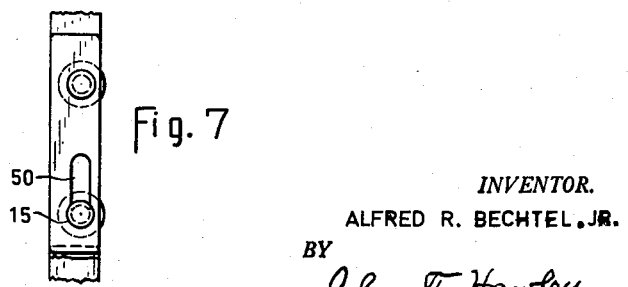
INVENTOR.
ALFRED R. BECHTEL, JR.
BY
Chas. T. Hawley
ATT'Y.

United States Patent Office 2,862,609
Patented Dec. 2, 1958

2,862,609

HEAVY DUTY FLAT WIRE CONVEYOR BELT

Alfred R. Bechtel, Jr., Portsmouth, R. I., assignor to Ashworth Bros. Inc., Fall River, Mass., a corporation of Massachusetts Application February 28, 1956, Serial No. 568,360

2 Claims. (Cl. 198—193)

This invention relates to a conveyor belt of the flat wire type which is particularly designed for heavy duty.

It is the general object of my invention to reduce the drag or friction of such a belt by providing a plurality of spaced rollers, so disposed that the belt and load are supported by the rolls and that only the rolls contact the supporting structure.

My invention further relates to arrangements and combinations of parts which will be hereinafter described and more particularly pointed out in the appended claims.

Preferred forms of the invention are shown in the drawings, in which

Fig. 1 is a plan view of a portion of a conveyor belt embodying my invention;

Fig. 2 is a side elevation thereof;

Fig. 3 is a partial plan view similar to Fig. 1 but showing a different arrangement of rolls;

Fig. 4 is a side elevation thereof;

Fig. 5 is a plan view of a modified construction using a larger number of supporting rolls;

Fig. 6 is a side elevation thereof; and

Fig. 7 is a side elevation showing a further modification.

Referring to Figs. 1 and 2, I have shown a portion of a flat wire conveyor belt comprising continuous transverse links or units 10 of flat wire, reversely bent to provide the alternate U-shaped bends shown in Fig. 1.

The legs or side portions 11 of each band are provided with holes 12 and 14 to receive connecting or pivot rods 15. Loose rolls 20 are mounted on the rods 15 between alternate pairs of legs or side portions 11.

It will be noted from Fig. 2 that the holes 12 and 14 are nearer the bottom edge 22 of the legs or side portions 11, so that the rolls 20 project below the bottom edge 22 and thus provide roller bearings for the belt. It will also be noted that the holes 14 are spaced somewhat further from the adjacent ends of the units 10 to provide clearance for the rolls 20. The rolls 20 do not ordinarily project above the upper edges of the legs 11.

As shown in Fig. 1, the rolls 20 are disposed in transversely-spaced series lengthwise of the belt. In the construction shown in Fig. 3, the rolls 30 are alternated but spaced apart in each transverse row, while in Fig. 5 rolls 40 are provided in adjacent longitudinal series on all pins 15, the construction shown in Fig. 5 being particularly adapted for exceptionally heavy loads.

It will be noted in Figs. 1 and 2 that the holes 12 are nearer the ends of the legs 11 than the holes 14. This locates the adjacent rod 15 close to the end portions of the loops or bends in which no rollers are mounted and thus provides more clearance for the teeth of a driving sprocket.

In Fig. 7, I have shown a modification in which the holes 50 which receive one of the pins 15 are made in the form of slots, so that the belt may follow a transversely curved path.

A belt formed as shown in any of the several figures will move a given load with substantial reduced power.

Having thus described my invention and the advantages thereof, I do not wish to be limited to the details herein disclosed, otherwise than as set forth in the claims, but what I claim is:

1. A flat wire conveyor belt of substantial width and comprising continuous transverse links each having a plurality of substantially U-shaped bends forming pairs of adjacent legs and said bends being disposed in parallel longitudinal series in said belt, cross-pins pivoted in said legs, and load-supporting rollers loosely mounted on successive cross-pins and uniformly spaced across the full width of the fabric, and each roller having its cylindrical peripheral portion projecting beyond the adjacent edge of its associated link, and all of said rollers projecting from the same face of the belt.

2. The combination in a flat wire conveyor belt as set forth in claim 1, in which the rollers are mounted between the legs of a link and closely adjacent the closing bend only which joins said legs.

References Cited in the file of this patent

UNITED STATES PATENTS

| 1,050,584 | Wilkens | Jan. 14, 1913 |
| 1,674,833 | MacChesney | June 26, 1928 |
| 1,724,150 | Webb | Aug. 13, 1929 |
| 2,139,380 | Norris | Dec. 6, 1938 |
| 2,658,607 | Moynihan | Nov. 10, 1953 |